United States Patent [19]

Ogawa et al.

[11] Patent Number: 4,769,947
[45] Date of Patent: Sep. 13, 1988

[54] WEATHER STRIP FOR AUTOMOBILE

[75] Inventors: Kazuo Ogawa, Inazawa; Haruhisa Kawase, Nagoya; Hideyuki Hashimoto, Nishikasugai, all of Japan

[73] Assignee: Toyoda Gosei Co., Ltd., Nishikasugai, Japan

[21] Appl. No.: 16,937

[22] Filed: Feb. 20, 1987

[30] Foreign Application Priority Data

Feb. 21, 1986 [JP] Japan .................................. 61-037867
Jan. 21, 1987 [JP] Japan .................................. 62-011569

[51] Int. Cl.$^4$ ............................................... E06B 7/16
[52] U.S. Cl. ......................................... 49/479; 249/63; 49/498
[58] Field of Search ................ 49/479, 498, 497, 506, 49/482, 485, 486; 249/57, 63, 100, 64

[56] References Cited

U.S. PATENT DOCUMENTS 3,037,251  6/1962  Landis .................................. 49/479
3,553,301  1/1971  Reardow .............................. 49/479

Primary Examiner—Kenneth J. Dorner
Assistant Examiner—Gerald A. Anderson
Attorney, Agent, or Firm—Cushman, Darby & Cushman

[57] ABSTRACT

A weather strip for an automobile has a base portion to be installed along an opening of the automobile for a door, and a hollow sealing portion to be pressed by an outer peripheral edge of the door. One portion of the hollow sealing portion is formed into a molded portion by molding. The molded portion has a slit through which a core for forming the molded portion hollow is drawn out, and a partition wall longitudinally partitioning an inner space of the molded portion and separating the slit in the middle thereof. The partition wall extends straight in the direction inclined with respect to the door pressing direction. According to the weather strip of the present invention, the separated slit is not widely opened at the door pressing time by virtue of the partition wall, and accordingly, uniform flexibility can be obtained over the whole length of the molded portion since the partition wall is inclined with respect to the door pressing direction.

6 Claims, 4 Drawing Sheets

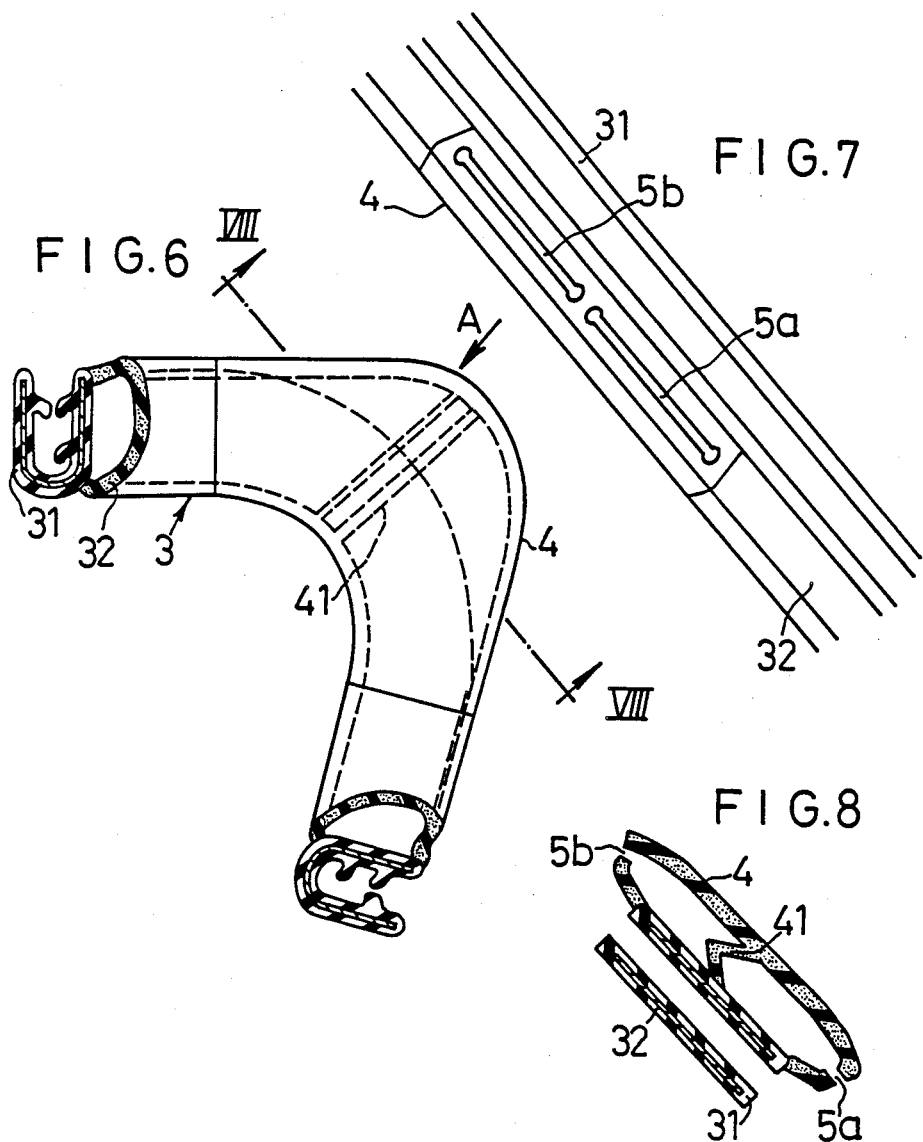

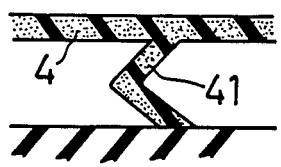
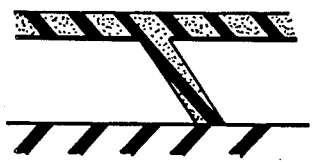
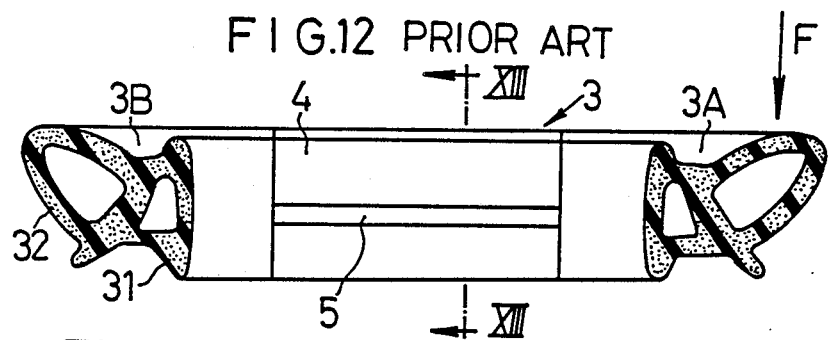
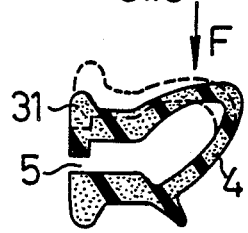
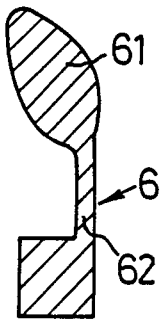

WEATHER STRIP FOR AUTOMOBILE

BACKGROUND OF THE INVENTION

1. Field of the Invention

The present invention relates to a weather strip to be installed along an opening of an automobile body for a door thereof.

2. Description of the Prior Art

In an automobile as shown in FIG. 1, the gap between an opening 1 for a door 2 and the door 2 is sealed by a weather strip.

FIGS. 12 and 13 illustrate one example of a conventional weather strip of the above described type.

A weather strip 3 is composed of an extruded body made of sponge rubber, which has a base portion 31 and a hollow sealing portion 32.

In corner portions A, and joint portions B wherein a roof side portion of an automobile body is jointed to a lower half portion thereof, which is to be in contact with a door body, as shown in FIG. 1, are installed weather strips, each being composed of extruded weather strips 3A and 3B which are jointed by molding.

A molded portion 4 is formed by setting ends of a pair of extruded weather strips 3A and 3B within a cavity of a mold so as to be opposed to each other, setting a molding portion 61 of a core 6, havig a sectional shape as shown in FIG. 14, between both ends of the weather strips 3A and 3B for obtaining a hollow molded portion 4. and pouring a rubber material around the forming portion 61. In FIGS. 12 and 13, a reference numeral 5 denotes a slit which remains hollow after the core 6 is removed in the step following the molding step.

Another example of the conventional weather strip of the above described type has a U-shaped sectioned base portion made of solid rubber and a hollow sealing portion made of sponge rubber provided along the side surface of the base portion. For forming curved portions of this weather strip, which extend along corner portions of an opening for a door, only the hollow sealing portions to be formed into the curved portions are cut away, the remaining base portions are made curved, the obtained curved base portions are set within a cavity of a mold, cores are set within the cavity and a rubber material is poured into the cavity whereby the hollow sealing portion is molded.

In the weather strip installed in an opening for a door, the hollow sealing portion is pressed by a peripheral edge of the door when the door is closed. For example, in the case of a weather strip 3 shown in FIG. 12, pressing load is applied in a direction shown by an arrow F. Accordingly, the slit 5 is opened as shown by a dotted line in FIG. 13 and the weather strip S is fallen down in its base portion. This results in sufficient sealing force being not obtained.

For overcoming the above described problem, such a measure of coating opposed surfaces defining the slit 5 with an adhesive and bonding the coated opposed surfaces to each other to close the slit 5, has been adopted. However, this measure comes short of work efficiency since the bonding work is troublesome.

SUMMARY OF THE INVENTION

It is one object of the present invention to provide a hollow weather strip for automobiles, of which one portion is formed by molding and has excellent sealing property similar to that of other extruded portions.

It is another object of the present invention to provide a weather strip to be installed along an opening of an automobile for a door thereof, of which slits for drawing out cores, inevitably formed in the molding step are not widely opened when the door is pressed against the weather strip, and which has uniform sealing property over the whole length of the molded portions.

In the weather strip according to the present invention, a partition wall 41 is formed so as to divide an inner space of a molded portion 4 of a hollow sealing portion and the partition wall 41 is formed inclined with respect to the direction of load such as a door(arrow F) as shown in FIG. 2.

The partition wall 41 need not be always made inclined over the whole length thereof. Only one portion 411 of the partition wall 41 may be made inclined as shown in FIG. 4 (perpendicular to the direction of load).

In the hollow molded portion 4 obtained according to the present invention, the peripheral wall thereof is formed integrally with the partition wall 41. This results in the slits 5a and 5b being not opened. If the partition wall 41 is formed in a directon equal to that of load, namely the direction perpendicular to the direction of length of the weather strip, a large reaction force is locally generated in the vicinity of the partition wall 41 to decrease the sealing property when the hollow sealing portion is pressed by the door. In contrast, by forming the partition wall 41 inclined with respect to the pressing load, the partition wall 41 is easily bent by the pressing force to generate uniform sealing pressure over the whole length of the weather strip.

BRIEF EXPLANATION OF THE DRAWINGS

FIG. 2 is a front view of the wheather strip;

FIG. 3 is a sectional view taken along the line III—III of FIG. 2;

FIG. 4 is a front view of the weather strip;

FIG. 5 is a sectional view taken along the line V—V of FIG. 4;

FIGS. 6 to 10 illustrate a third embodiment of the weather strip according to the present invention;

FIG. 6 is a perspective view of a corner portion of the weather strip;

FIG. 7 is a view of the weather strip taken in the arrow of A;

FIG. 8 is a sectional view taken along the line of VIII—VIII of FIG. 6;

FIG. 9 is a view illustrating the partition wall of the weather strip when the door is opened;

FIG. 10 is a view illustrating the partition wall when the door is closed;

FIG. 11 is a view illustrating another embodiment of the partition wall;

FIGS. 12 and 13 illustrate the conventional weather strip;

FIG. 12 is a front view of the weather strip;

FIG. 13 is a sectional view taken along the line of XIII—XIII of FIG. 12; and

FIG. 14 is a sectional view of a core used in the molding step of the weather strip.

DETAILED DESCRIPTION OF THE EMBODIMENTS

Hereinafter, the weather strip according to the present invention will be explained with the producing method thereof.

Figure 2:
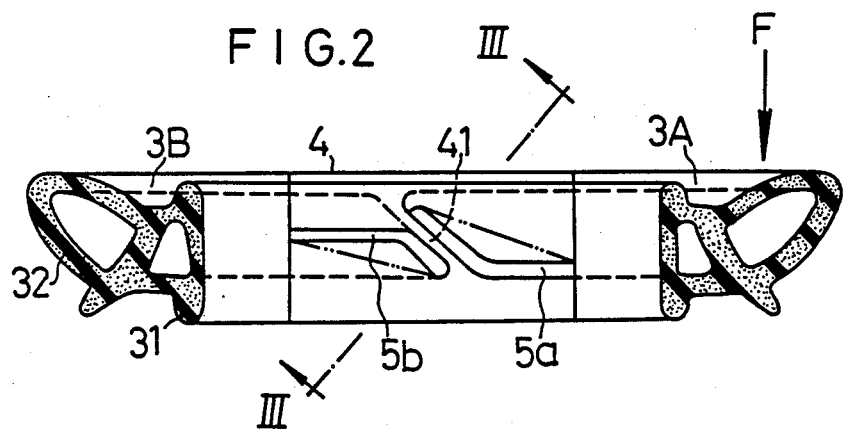
FIGS. 2 and 3 illustrate a first embodiment of a wheather strip according to the present invention.
Figure 3:
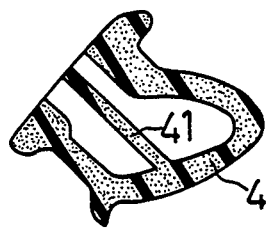

In a first embodiment shown in FIGS. 2 and 3, two weather strips 3A, 3B are prepared by extruding sponge rubber. Each of the weather strips 3A, 3B is composed of a base portion 31 and hollow sealing portion 32. An end of the weather strip 3A is connected to that of the weather strip 3B by means of a molded portion 4.

The molded portion 4 has a hollow inner space and a partition wall 41 which is inclined with respect to the vertical direction, is formed in the middle of the hollow inner space to define two separate dog-legged bent slits 5a and 5b for drawing out cores from the molded portion 4.

The molded portion 4 is formed by setting ends of the extruded weather strips 3A and 3B within an cavity of a mold and using a pair of cores. Namely, each core 6 has a longitudinal sectional shape as shown in FIG. 14, and a neck portion thereof has a dog-legged bent transverse sectional shape.

Both cores 6 are disposed so that the neck portions 62 form the slits 5a and 5b shown in FIG. 2. At this time, the cores 6 are opposed to each other through an inclined gap for forming the partition wall 41.

And then, rubber material is poured into the cavity. This results in a hollow sealing portion being formed around the cores 6 and an inclined partition wall 41 dividing the inner space of the hollow sealing portion being formed in the gap between the cores 6. After the mold is opened, the cores 6 are drawn out. In this case, the molding portion 61 of each of the cores 6 can be easily drawn out since the peripheral wall of the molded portion 4 is bent at the positions shown by alternate long and two short dashes lines.

In the obtained molded portion 4 of the weather strip, the slit is closed in the middle thereof by the partition wall 41 into short left and right slits 5a and 5b. This results in the slits 5a and 5b being not so widely opened as compared with the slit extending over the whole length of the molded portion 4 when the pressing load is applied in the direction of the arrow F at the door closing time.

Furthermore, since the partition wall 41 is inclined with respect to the door pressing direction, it is easily bent not to generate large reaction force against the pressing pressure. This results in reaction force being not abruptly changed in one portion of the molded portion, and accordingly, the molded portion comes in uniform pressure contact with the door over the whole length thereof to exhibit preferable sealing property.

Figure 4:
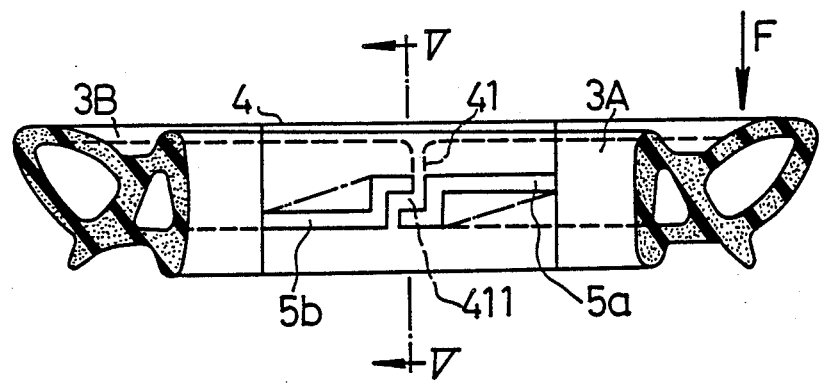
FIGS. 4 and 5 illustrate a second embodiment of the weather strip according to the present invention.
Figure 5:
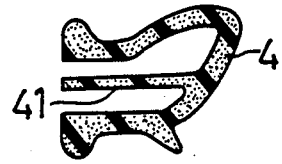

FIGS. 4 and 5 illustrate a second embodiment of the weather strip according to the present invention.

The molded portion 4 is formed by using a pair of cores 6, each of which has a surface having a hook-shaped neck section. In the molded step, the hook-shaped sectioned surfaces of the cores 6 are opposed to each other through a hook-shaped sectioned gap within the mold. This results in the molded portion 4 being provided with a partition wall 41 of a hook-shaped sectional shape. The slits 5a and 5b for drawing out the cores 6 are separated from each other by the partition wall 41.

The partition wall 41 has an inclined portion 411 which is inclined in the direction perpendicular to the load operating direction F. In the weather strip of the second embodiment, the inclined portion 411 is easily bent not to generate abrupt change of reaction force when being pressed by the door. And after the molded portion is formed, the cores can be easily drawn out from the molded portion 4 since the peripheral wall of the molded portion 4 is bent at the position shown by alternate two short and one long dashes line.

FIGS. 6 through 10 illustrate a third embodiment.

The weather strip S is composed of an extruded body having a base portion 31 of a U shaped cross section, wherein a core metal 32 is embedded, and a hollow sealing portion 32. The base portion 31 is made of solid rubber, and the sealing portion 32 is made of sponge rubber.

Figure 1:
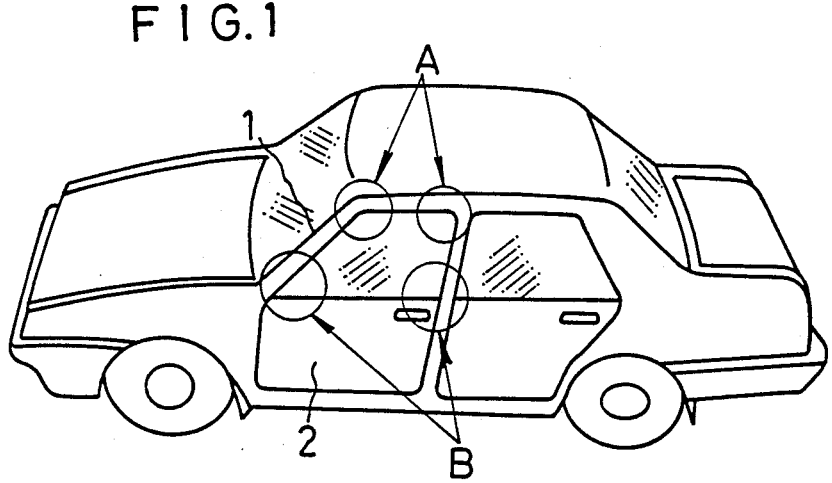
FIG. 1 is a perspective view of an automobile.

FIG. 6 illustrates the portion to be installed in a corner portion of an opening for a door(shown by A in FIG. 1). Only the corner portion of the sealing portion 32 is formed by molding. The molded portion 4 is formed into such a shape as to outwardly expand in the corner portion for improving the sealing property in the corner portion.

Formed in the molded portion 4 is a partition wall 41 which patitions the inner space. As shown in FIG. 8, the partition wall 41 has a dog-legged bent sectional shape and is inclined with respect to the door pressing direction (F direction).

The curved portion of the weather strip according to the third embodiment is produced as follows. Namely, at first, the weather strip is formed by extruding. Next, the portion of the hollow sealing portion 32 which is to be formed into a curved portion is cut away. Then, the base portion 31 to be installed in a corner portion is made curved. The obtained curved base portion 31 is set within a cavity of a mold. At the same time, a pair of cores are set within the cavity so as to be opposed through an interval. The surface of one of cores, which is opposed to the other core has a concave dog-legged section and the surface of the other core, which is opposed to one of the cores has a convex dog-legged section.

Then, rubber material is poured into the cavity of the mold wherein he curved base portion 31 and the pair of cores are previously set. And after the mold is opened, the cores are drawn out from the molded portion. This results in a hollow molded portion 4 having a partition wall 41 having a dog legged section, and two lines of slits 5a and 5b, being obtained.

FIGS. 9 and 10 illustrate the conditions of the partition wall 41 of the weather strip installed in an opening of an automobile for a door, at the door opening time and the door closing time, respectively.

As shown in FIG. 10, when the door is closed, the molded portion 4 is pressed in the direction of the arrow F by the door and the partition wall 41 is easily deformed so that its bent portion is bent further. This results in the molded portion 4 exhibiting uniform flexibility over the whole length thereof.

Furthermore, the slits 5a and 5b are not continued but separated so as not to largely open when the door is closed.

FIG. 11 illustrates another embodiment of the partition wall 41. The whole partition wall 41 is inclined with respect to the direction of load. The weather strip provided with this partition wall 41 also exhibits an operation effect similar to that of the preceding embodiments.

As described above, according to the weather strip of the present invention, the slits for drawing out the cores are not widely opened at the door pressing time by virtue of the formation of the partition wall in the hollow molded portion, and uniform flexibility can be obtained over the whole length of the molded portion since the partition wall is inclined with respect to the direction of the pressing load by the door.

What is claimed is:

1. A weather strip for an automobile, comprising:
a base portion to be installed along an opening of the automobile for a door, and a hollow sealing portion to be pressed by an outer peripheral edge of the door;
one portion of at least said hollow sealing portion being formed by molding into a molded portion;
said molded portion having a slit through which a core for forming said molded portion hollow is drawn out, and a partition wall longitudinally partitioning an inner space of said molded portion and separating said slit in the middle of said slit;
at least one portion of said partition wall being inclined with respect to a door pressing direction.

2. A weather strip according to claim 1, wherein said partition wall extends straight in a direction inclined with respect to the door pressing direction.

3. A weather strip according to claim 1, wherein said partition wall has a dog-legged section composed of two inclined portions inclined in different directions with respect to the door pressing direction.

4. A weather strip according to claim 1, wherein said partition wall has a hook-shaped section composed of an inclined portion perpendicularly inclined with respect to the door pressing direction and two portions, each extending in the door pressing direction, which are connected by said inclinded portion.

5. A weather strip according to claim 1, wherein said weather strip is composed of a plurality of extruded weather strips connected by said molded portion.

6. A weather strip according to claim 1, wherein one portion of said hollow sealing portion of an extruded weather strip is cut away and said molded portion is formed in the cut away portion.

* * * * *